(12) United States Patent
Wang

(10) Patent No.: US 11,607,742 B2
(45) Date of Patent: Mar. 21, 2023

(54) REFLOW OVEN

(71) Applicant: ILLINOIS TOOL WORKS INC., Glenview, IL (US)

(72) Inventor: Yuwei Wang, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 12 days.

(21) Appl. No.: 17/115,431

(22) Filed: Dec. 8, 2020

(65) Prior Publication Data

US 2021/0170514 A1 Jun. 10, 2021

(30) Foreign Application Priority Data

Dec. 10, 2019 (CN) .......................... 201911258961.1

(51) Int. Cl.
*B23K 1/008* (2006.01)
*B23K 101/42* (2006.01)

(52) U.S. Cl.
CPC .......... *B23K 1/008* (2013.01); *B23K 2101/42* (2018.08)

(58) Field of Classification Search
CPC ............... B23K 1/008; F27B 2009/126; F27B 2009/3027; F27B 9/3005; H05K 2203/043; H05K 3/303; H05K 3/3494
See application file for complete search history.

(56) References Cited

U.S. PATENT DOCUMENTS 4,938,410 A * 7/1990 Kondo ................... B23K 1/008
228/180.1

5,345,061 A * 9/1994 Chanasyk ............. B23K 1/008
219/400

(Continued)

FOREIGN PATENT DOCUMENTS

CN 201895158 * 10/2010
CN 210172742 * 3/2020

(Continued)

OTHER PUBLICATIONS

UK Search Report Appln No. 2019141.7 dated May 27, 2021.
French Preliminary Search Report Appln No. FR2012905 dated Jun. 16, 2022.

*Primary Examiner* — Erin B Saad
*Assistant Examiner* — Carlos J Gamino
(74) *Attorney, Agent, or Firm* — McAndrews Held & Malloy, Ltd.

(57) ABSTRACT

The present disclosure provides a reflow oven, which comprises: a soldering section configured to treat a circuit board to be soldered and provided with N soldering sub-zones; a purification section comprising M purification sub-zones, wherein each of the M purification sub-zones is in communication with one of the N soldering sub-zones, and M is less than or equal to N; a controllable discharge pipeline and K discharge branch pipes, each of the K discharge branch pipes communicating one of the M purification sub-zones with the controllable discharge pipeline; and a valve device configured to, at the inlet thereof, connect with the outlet of the controllable discharge pipeline to control open/close of the communication between the controllable discharge pipeline and the external environment. The reflow oven provided by the present disclosure can work in an air mode and in an inert gas mode.

2 Claims, 3 Drawing Sheets

(56) References Cited

U.S. PATENT DOCUMENTS

| | | | | |
|---|---|---|---|---|
| 5,440,101 A * | 8/1995 | Cox | ..................... | H05K 13/02 34/212 |
| 5,579,981 A * | 12/1996 | Matsumura | ............ | B23K 1/008 228/19 |
| 5,611,476 A * | 3/1997 | Soderlund | ............ | B01D 53/002 228/43 |
| 5,993,500 A * | 11/1999 | Bailey | .................... | B23K 1/008 55/385.6 |
| 6,120,585 A * | 9/2000 | Inomata | ................ | B23K 1/012 96/377 |
| 6,146,448 A * | 11/2000 | Shaw | .................... | B23K 1/008 55/467 |
| 10,576,567 B2 * | 3/2020 | Diepstraten | .............. | B23K 3/08 |
| 2002/0178705 A1 * | 12/2002 | Mullins | ................. | B23K 1/008 55/385.2 |
| 2003/0136020 A1 * | 7/2003 | Miller, Jr. | .............. | B23K 1/008 34/429 |
| 2003/0218058 A1 | 11/2003 | Shaw | | |
| 2007/0284408 A1 * | 12/2007 | Asai | ........................ | B23K 3/08 228/42 |
| 2009/0206145 A1 * | 8/2009 | Tamori | .................. | B23K 1/008 228/15.1 |
| 2014/0209662 A1 * | 7/2014 | Ngai | .................... | F27D 1/1678 134/4 |
| 2019/0062195 A1 * | 2/2019 | Sønderkaer | ........... | E06B 3/6733 |
| 2019/0234342 A1 * | 8/2019 | Saito | ..................... | B01D 5/009 |
| 2021/0178307 A1 * | 6/2021 | Wang | ................... | H05B 1/0247 |
| 2021/0180867 A1 * | 6/2021 | Wang | ..................... | F27D 21/04 |
| 2021/0197304 A1 * | 7/2021 | Wang | ..................... | B23K 3/04 |
| 2021/0339330 A1 * | 11/2021 | Yan | ..................... | B23K 35/383 |

FOREIGN PATENT DOCUMENTS

| | | | |
|---|---|---|---|
| CN | 210718617 | * | 6/2020 |
| WO | 2019204623 A1 | | 10/2019 |

* cited by examiner

REFLOW OVEN

RELATED APPLICATIONS

The present application claims the benefit of Chinese Patent Application No. 201911258961.1, filed Dec. 10, 2019, entitled "REFLOW FURNACE." The entirety of Chinese Patent Application No. 201911258961.1 is expressly incorporated herein by reference.

TECHNICAL FIELD

The present disclosure relates to a reflow oven, and particularly to a reflow oven capable of working in an air mode and in an inert gas mode.

BACKGROUND

During the manufacture of printed circuit boards, electronic elements are mounted on the circuit boards generally by means of a process known as "reflow soldering". In a typical reflow soldering process, solder paste (e.g., tin paste) is deposited onto selected areas of a circuit board, and conduct wires of one or more electronic elements are inserted into the deposited solder paste. The circuit board is then be passed through a reflow oven where the solder paste reflows in a heating zone (i.e., being heated to a melting or reflow temperature) and is then cooled in a cooling zone to electrically and mechanically connect the conduct wires of the electronic elements to the circuit board. As used herein, the term "circuit board" includes a substrate assembly comprising any type of electronic elements, for example, including a wafer substrate.

Typically, the solder paste includes not only a solder, but also a soldering flux which makes the solder become wet and provides a good solder joint. Other additives such as solvents and catalysts may also be included. After the solder paste is deposited on the circuit board, the circuit board is transported on a conveyer to pass through a plurality of heating zones of the reflow oven. The heat in the heating zones melts the solder paste and simultaneously vaporizes volatile organic compounds (referred to as "VOCs") in the soldering flux and other additives in the solder paste to form vapor. The vapor is hereinafter referred to as "volatile pollutants".

The accumulation of these volatile pollutants in the reflow oven may cause some problems. If the temperature of the volatile pollutants decreases, they may condense on the circuit board and contaminate the circuit board, thereby necessitating subsequent cleaning steps. The volatile pollutants may also condense on a surface of a cooler of the reflow oven, thereby blocking gas holes. Condensate may also drip onto subsequent circuit boards, thus the subsequent circuit boards will be harmed, or a subsequent cleaning step will be needed.

In the reflow oven, air or an inert gas (e.g., nitrogen) is generally used as a working atmosphere, and different working atmospheres are used for circuit boards having different process requirements. A hearth of the reflow oven is full of the working atmosphere, and the circuit board is soldered in the working atmosphere while being transported through the hearth by a conveyer. For a reflow oven in which air is used as the working atmosphere, fresh air is generally introduced from two ends of the oven, and the air flows in the reflow oven in such a manner that the circuit board is heated or cooled, and the air is then discharged from an interior area of the reflow oven together with the volatile pollutants. In addition, the precise distribution of temperature required for the reflow processing should also be met when the volatile pollutants are treated.

SUMMARY OF THE DISCLOSURE

The present disclosure provides a reflow oven, which more effectively treats volatile pollutants, thereby reducing the subsequent maintenance and service burden.

The reflow oven can work in an inert gas mode and in an air mode, and comprises: a soldering section configured to treat a circuit board to be soldered and provided with N soldering sub-zones; a purification section comprising M purification sub-zones, wherein each of the M purification sub-zones is in communication with a corresponding one of the N soldering sub-zones, and M is less than or equal to N; a controllable discharge pipeline and K discharge branch pipes, each of the K discharge branch pipes communicating one of the M purification sub-zones with the controllable discharge pipeline, wherein K is less than or equal to M; and a valve device, at the inlet thereof, connects with the outlet of the controllable discharge pipeline to open/close the communication between the controllable discharge pipeline and the external environment.

In the reflow oven as described above, the reflow oven works in the air mode when the valve device is opened; the reflow oven works in the inert gas mode when the valve device is closed.

In the reflow oven as described above, an outlet of the valve device is in communication with an ventilation device.

The reflow oven as described above further comprises: an inlet zone and an outlet zone, the inlet zone and the outlet zone being respectively provided at two ends of the soldering section; a pair of inlet zone isolation ducts, the pair of inlet zone isolation ducts being respectively in communication with an upper side and a lower side of the inlet zone; and a pair of outlet zone isolation ducts, the pair of outlet zone isolation ducts being respectively in communication with an upper side and a lower side of the outlet zone.

In the reflow oven as described above, a first end of each of the pair of inlet zone isolation ducts is in communication with the upper side and the lower side of the inlet zone respectively, a second end of one of the pair of inlet zone isolation ducts is in communication with the controllable discharge pipeline, and a second end of the other of the pair of inlet zone isolation ducts is in communication with one of the N soldering sub-zones.

In the reflow oven as described above, the soldering section comprises a heating zone and a cooling zone, and each soldering sub-zone in the heating zone is in communication with a corresponding one of the purification sub-zones.

In the reflow oven as described above, each soldering sub-zone in the heating zone and the purification sub-zone in communication with the soldering sub-zone form a heating work unit including an internal circulation unit and an external circulation unit; and each of the purification sub-zones is provided with a purification zone gas flow inlet and a purification zone gas flow outlet, the purification zone gas flow inlet and the purification zone gas flow outlet of the purification sub-zone of the internal circulation unit are both in communication with a corresponding soldering sub-zone, the purification zone gas flow inlet of the purification sub-zone of the external circulation unit is in communication with a corresponding soldering sub-zone, and the purification zone gas flow outlet of the purification sub-zone of the external circulation unit is in communication with the controllable discharge pipeline through a corresponding discharge branch pipe of the K discharge branch pipes.

In the reflow oven as described above, the external circulation units are provided at or close to front and rear ends of the heating zone.

In the reflow oven as described above, each of the N soldering sub-zones comprises: a flow guide device capable of guiding part of gas in the soldering sub-zone to flow toward the corresponding purification sub-zone.

In the reflow oven as described above, each of the M purification sub-zones comprises: a catalytic device and a heating device; and the heating device has a catalytic work mode and a maintenance work mode.

In the reflow oven of the present disclosure, by improving the discharge pipeline and the valve device, the soldering work can be effectively carried out in two work modes, namely the air mode and inert gas mode, by using a set of equipment. In the inert gas work mode, only a small amount of inert gas needs to be supplemented, so that the use amount of inert gas is saved. In the air work mode, the yield of the processed circuit board can still meet the requirements. When the work mode needs to be switched, only the valve device needs to be opened or closed, so that the switching between the two work modes is simple and easy to operate. In the two work modes, the subsequent maintenance and service burden for the reflow oven can be reduced.

BRIEF DESCRIPTION OF THE DRAWINGS

A reflow oven of the present disclosure will become more easily understood when reading the following detailed description in conjunction with the accompanying drawings, throughout the drawings, like reference numbers represent like parts, in the drawings.

DETAILED DESCRIPTION OF EMBODIMENTS

Figure 1:
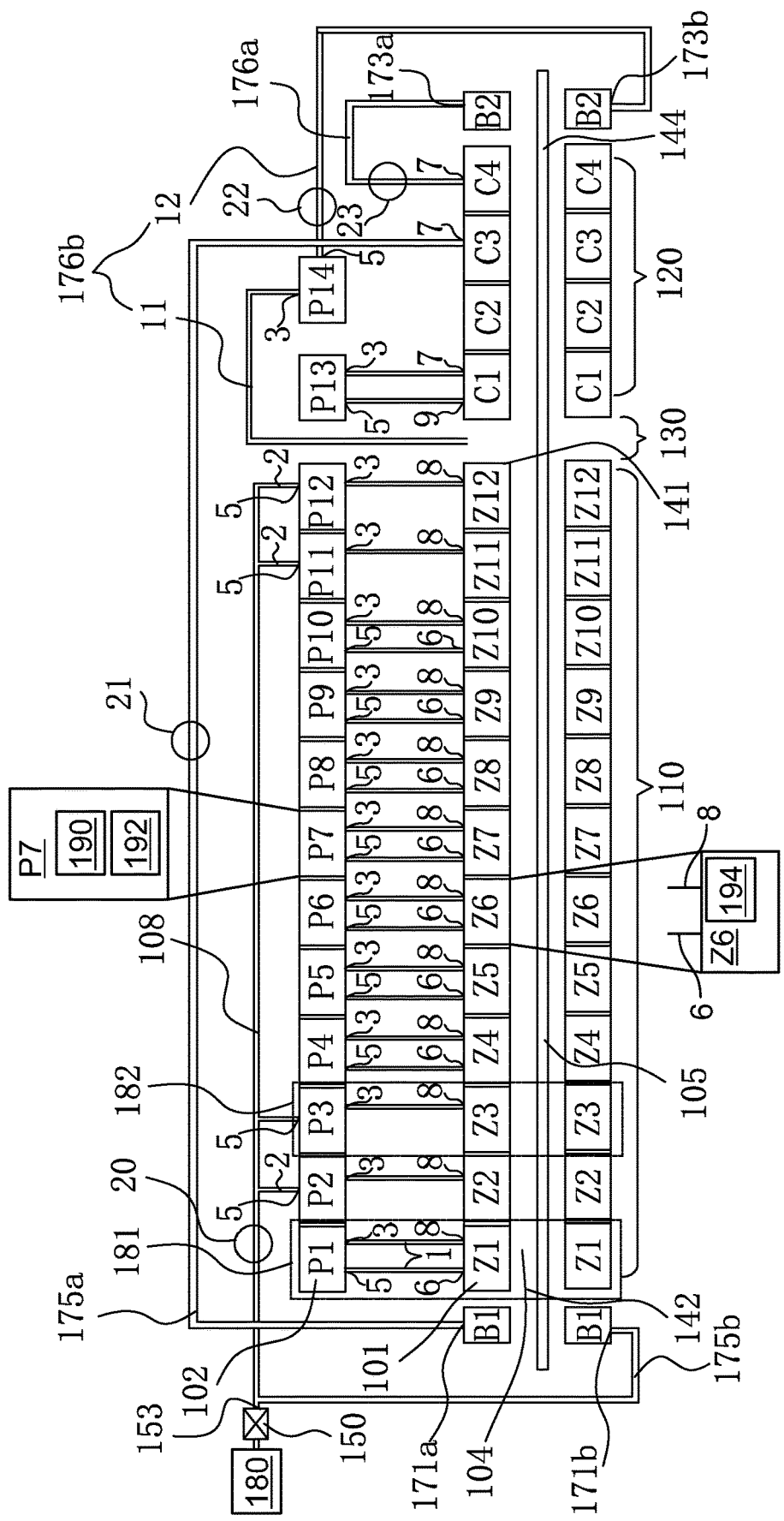
FIG. 1 shows a simplified schematic diagram of an embodiment of a reflow oven of the present disclosure.

Specific embodiments of the present disclosure are described below with reference to the accompanying drawings which constitute part of this description. It is to be understood that although the terms indicating orientations, such as "front", "rear", "upper", "lower", "left", "right", "inner", "outer", "top" and "bottom", are used in the present disclosure to describe structural parts and elements in various examples of the present disclosure, these terms are used herein only for ease of illustration and are determined based on the exemplary orientations as shown in the accompanying drawings. Since the embodiments disclosed in the present disclosure can be arranged in different orientations, these terms indicating orientations are only illustrative and should not be considered as limitations. If possible, the same or similar reference numerals used in the present disclosure refer to the same components.

FIG. 1 shows a simplified schematic diagram of an embodiment of a reflow oven 100 of the present disclosure. The reflow oven 100 may be used as an air/inert gas switchable reflow oven, which may use either air or inert gas as a working atmosphere, such that the reflow oven 100 can work in both an air mode and an inert gas mode. For example, the inert gas is nitrogen. The working condition of the reflow oven 100 of the present disclosure in the inert gas mode is described below using the nitrogen as an example. It should be noted, however, that the reflow oven 100 of the present disclosure is not limited to the use of nitrogen as an inert gas, but may use any inert gas.

As shown in FIG. 1, the reflow oven 100 comprises a soldering section 101, a purification section 102, and a hearth 104. It should be noted that FIG. 1 shows a view seen from the lateral side of the reflow oven 100, in which a housing for shielding front and rear sides of the hearth 104 is removed in FIG. 1 for ease of describing the reflow oven 100.

The hearth 104 is provided by running through the soldering portion 101, and the hearth 104 comprises a hearth inlet 142 and a hearth outlet 144. The reflow oven 100 is further provided with a conveying device 105, the conveying device 105 is arranged throughout the hearth 104 for conveying a circuit board to be treated from the hearth inlet 142 of the hearth 104 into the hearth 104, and conveying the circuit board treated by the reflow oven 100 out of the hearth 104 through the hearth outlet 144 of the hearth 104.

The soldering section 101 comprises a heating zone 110 and a cooling zone 120. A isolation and exhaust zone 130 is also provided between the heating zone 110 and the cooling zone 120. The hearth 104 is provides by running through the heating zone 110, the cooling zone 120 and the isolation and exhaust zone 130, and the heating zone 110, the cooling zone 120 and the isolation and exhaust zone 130 are in fluid communication with one another through the hearth 104. In addition, the heating zone 110, the cooling zone 120 and the isolation and exhaust zone 130 themselves are each also in fluid communication with the hearth 104. The isolation and exhaust zone 130 draws or exhausts gas from the hearth 104, thereby hindering or reducing the entry of the gas containing volatile pollutants from the heating zone 110 into the cooling zone 120. Furthermore, by drawing or exhausting the gas from the hearth 104, the isolation and exhaust zone 130 can also serve as a temperature isolation zone for isolating the high-temperature heating zone 110 from the low-temperature cooling zone 120.

The heating zone 110 and the cooling zone 120 may each comprise a plurality of soldering sub-zones. In the embodiment shown in FIG. 1, the heating zone 110 comprises twelve soldering sub-zones Z1-Z12, and the twelve soldering sub-zones are connected in sequence and have gradually increasing temperatures. Each soldering sub-zone is in communication with an adjacent soldering sub-zone only through the hearth 104. After the circuit board is conveyed into the heating zone 110 by the conveying device 105, the circuit board is heated, and some of pollutants in a soldering flux in the solder paste dispensed on the circuit board will be vaporized. The cooling zone 120 comprises four soldering sub-zones C1-C4. After the circuit board is conveyed from the heating zone 110 into the cooling zone 120, the solder paste is cooled to be solidified on a soldering zone of the circuit board, thereby connecting an electronic element to the circuit board. It should be noted that the numbers of the soldering sub-zones of the heating zone 110 and the cooling zone 120 of the reflow oven may be set according to process requirements and are not limited to the embodiment shown in FIG. 1.

The purification section 102 comprises a plurality of purification sub-zones (P1-P14), and each purification sub-zone is in communication with a corresponding one of the soldering sub-zones for purifying the gas in the soldering sub-zone. A catalytic device 190 and a heating device 192 are provided in each purification sub-zone, and the catalytic device 190 is provided with a catalyst, which can catalyze the decomposition of the volatile pollutants in the soldering flux into ingredients which are less liable to condensation, such that the hearth 104 can be kept clean for a longer time, and the circuit board is prevented from being contaminated. The heating device 192 has a catalytic work mode and a maintenance work mode, wherein in the catalytic work mode, the temperature of the heating device 192 is set such that the temperature in the purification sub-zones is suitable for the catalytic device 190 to catalyze the decomposition of the pollutants in the soldering flux; and in the maintenance work mode, the temperature of the heating device 192 is set such that the temperature in the purification sub-zones can activate the catalyst on the catalytic device 190.

The total number of the purification sub-zones in the heating device may be equal to or less than the total number of the soldering sub-zones. In the present disclosure, there are sixteen soldering sub-zones and fourteen purification sub-zones.

The reflow oven 100 further comprises a controllable discharge pipeline 108, a plurality of discharge branch pipes 2 and a valve device 150, for discharging the gas from the heating zone 110 of the reflow oven 100. One end of each of the plurality of discharge branch pipes 2 is in communication with a corresponding purification sub-zone, and the other end thereof is in communication with the controllable discharge pipeline 108, such that the gas in the corresponding purification sub-zone can enter the controllable discharge pipeline 108. The number of the discharge branch pipes 2 is less than or equal to the number of the purification sub-zones, and in the present disclosure, the number of the discharge branch pipes 2 is four. The controllable discharge pipeline 108 is provided with an outlet 153, and the outlet 153 is in communication with an inlet of the valve device 150, such that the controllable discharge pipeline 108 is in communication with the external environment through the valve device 150. By controlling the opening or closing of the valve device 150, the open/close of the communication between the controllable discharge pipeline 108 and the external environment can be controlled.

Still referring to FIG. 1, each of the twelve soldering sub-zones (Z1-Z12) of the heating zone 110 is provided with a heating zone gas flow outlet 8, and some of the soldering sub-zones (e.g., Z2, Z3, Z11, Z12) are also provided with heating zone gas flow inlets 6; and some of the four soldering sub-zones (e.g., C1, C3, C4) of the cooling zone are provided with cooling zone gas flow outlets 7, and one soldering sub-zone C1 is provided with a cooling zone gas flow inlet 9. A flow guide device 194 is provided in each soldering sub-zone for guiding part of the gas in the soldering sub-zone to flow out of the heating zone gas flow outlet 8 or the cooling zone gas flow outlet 7. The flow guide device enables the gas in the soldering sub-zone to continuously flow so as to ensure that the distribution of temperature inside the soldering sub-zone is uniform. Each of the fourteen purification sub-zones (P1-P14) of the purification portion 102 is provided with a purification zone gas flow outlet 5 and a purification zone gas flow inlet 3. Each of the soldering sub-zones (Z1-Z12) in the heating zone 110 and a corresponding one of the purification sub-zones in the purification section 102 form a heating work unit, which may include an internal circulation unit 181 and an external circulation unit 182. In the internal circulation unit 181, the purification zone gas flow inlet 3 and the purification zone gas flow outlet 5 of each purification sub-zone are respectively in communication with the soldering sub-zone through corresponding purification branch pipes 1, such that the gas in the soldering sub-zone of the internal circulation unit 181 can enter the purification zone gas flow inlet 3 of the purification sub-zone from the heating zone gas flow outlet 8 and is purified in the purification sub-zone, and then the purified gas flows out of the purification zone gas flow outlet 5 and re-enters the soldering sub-zone. In the external circulation unit 182, the purification zone gas flow inlet 3 of each purification sub-zone is in communication with the soldering sub-zone through a corresponding purification branch pipe 1, and the purification zone gas flow outlet 5 is in communication with the controllable discharge pipeline 108 through a corresponding discharge branch pipe 2, such that the gas in the soldering sub-zone of the external circulation unit 182 can be discharged through the controllable discharge pipeline 108. Some of the soldering sub-zones in the cooling zone 120 and the corresponding one of the purification sub-zones forms a cooling work unit, and the other soldering sub-zones alone form a cooling work unit. The cooling work unit includes an internal circulation unit, such as a unit consisting of the soldering sub-zone C1 and the purification sub-zone P13. The purification zone gas flow inlet 3 and the purification zone gas flow outlet 5 of the purification sub-zone P13 are respectively in communication with the soldering sub-zone C4 through corresponding purification branch pipes 1, such that the gas in the soldering sub-zone C4 can enter the purification zone gas flow inlet 3 of the purification sub-zone P13 from the cooling zone gas flow outlet 7 and is purified in the purification sub-zone P13, and then the purified gas flows out of the purification zone gas flow outlet 5 and re-enters the soldering sub-zone C4 through the cooling zone gas flow inlet 9. Each heating work unit is in communication with an adjacent heating work unit only through the hearth 104, such that most of the gas inside each heating work unit flows inside the respective unit, and only a small amount of gas flows to the adjacent heating work unit through the hearth 104. Similarly, each cooling work unit is in communication with an adjacent cooling work unit only through the hearth 104, such that most of the gas inside each cooling work unit flows inside the respective unit, and only a small amount of gas flows to the adjacent cooling work unit through the hearth 104.

The reflow oven 100 further comprises an inlet zone B1 and an outlet zone B2, wherein the inlet zone B1 and the outlet zone B2 are respectively provided at two ends of the soldering portion 101. The inlet zone B1 and the outlet zone B2 are used for supplying gas flows toward the hearth inlet 142 and the hearth outlet 144 of the hearth 104 in the nitrogen mode to form gas curtains, and the gas curtains can block air from entering the hearth 104 from the external environment, thereby keeping the inert working atmosphere in the reflow oven 100 clean. To this end, upper and lower sides of the inlet zone B1 are provided with a pair of communication ports 171a, 171b, respectively, and upper and lower sides of the outlet zone B2 are provided with a pair of communication ports 173a, 173b, respectively.

The reflow oven 100 further comprises a pair of inlet zone isolation ducts 175a, 175b, and a pair of outlet zone isolation ducts 176a, 176b. One end of the inlet zone isolation duct 175a is in communication with the communication port 171a of the inlet zone B1, and the other end thereof is in communication with the soldering sub-zone C3 of the cooling zone. One end of the inlet zone isolation duct 175b is in communication with the communication port 171b of the inlet zone B1, and the other end thereof is in communication with the controllable discharge pipeline 108. The position where the inlet zone isolation duct 175b is in communication with the controllable discharge pipeline 108 is close to the valve device 150 and is located downstream of the position where the discharge branch pipe 2 is in communication with the controllable discharge pipeline 108. One end of the outlet zone isolation duct 176a is in communication with the soldering sub-zone C4 of the cooling zone, and the other end thereof is in communication with the outlet zone communication port 173a. One end of the outlet zone isolation duct 176b is in communication with the isolation and exhaust zone 130, and the other end thereof is in communication with the outlet zone communication port 173b. The outlet zone isolation duct 176b comprises a front section 11 and a rear section 12, and the front section 11 and the rear section 12 are in communication with each other through one purification sub-zone P14, such that the gas in the isolation and exhaust zone 130 can be purified in the purification sub-zone P14 and then flows to the outlet zone B2.

An outlet of the valve device 150 is in communication with an ventilation device 180 of a plant, such as air blower of the plant, such that when the valve device 150 is opened, the air blower draws air outwardly from the interior of the plant to accelerate the discharge of the gas from the controllable discharge pipeline 108. The reflow oven 100 comprises gas accelerating devices 20, 21, 22, 23 provided on the controllable discharge pipeline 108, the inlet zone isolation duct 175a, and the outlet zone isolation ducts 176a, 176b, respectively. The gas accelerating devices 20, 21, 22, 23 serve to guide the flow direction of the gas and accelerate the flow of the gas. The gas accelerating device 20 causes the gas in the controllable discharge pipeline 108 to flow in the direction of the valve device 150. The gas accelerating device 21 causes the gas to flow from the soldering sub-zone C3 of the cooling zone to the upper side of the inlet zone B1. The gas accelerating device 22 causes the gas from the exhaust zone 130 to be purified in the purification sub-zone P14 and then to flow toward the lower side of the outlet zone B2. The gas accelerating device 23 causes the gas from the soldering sub-zone C4 of the cooling zone to flow toward the upper side of the outlet zone B2.

As still shown in FIG. 1, the hearth inlet 142 and the hearth outlet 144 are respectively in communication with a nitrogen source (not shown in figures) or directly with the ambient atmosphere. A nitrogen source supplies clean nitrogen to the reflow oven 100 through the nitrogen source when the reflow oven 100 is working in the nitrogen mode. When the reflow oven 100 is working in the air mode, the reflow oven 100 obtains clean air directly from the atmosphere. In each of the soldering sub-zones of the heating zone 110 of the reflow oven 100, the temperature of the gas in the hearth 104 gradually increases from left to right, and different zones have different requirements for the temperature of the gas in the hearth 104, in order to meet the temperature requirements for the processing of the circuit board. The supply of clean gas from a location close to the hearth inlet 142 and the hearth outlet 144 to the reflow oven 100 enables the clean gas at ambient temperature to enter the soldering sub-zone with the lowest temperature in the heating zone, thereby avoiding significant effects on the temperature of the gas in the soldering sub-zone with the higher temperature in the heating zone. Since the gas is discharged outward through the isolation and exhaust zone 130 and the soldering sub-zones Z2, Z3, Z11, Z12, C3, C4, and the gas is heated in the heating zones 110 such that the gas pressure in the middle of the hearth 104 is lower than those at the hearth inlet 142 and the hearth outlet 144 for the entire hearth 104, the supply of clean gas from a location close to the hearth inlet 142 and a location close to the hearth outlet 144 to the reflow oven 100 enables the gas to enter the hearth 104 under the effect of pressure more easily.

Figure 2:
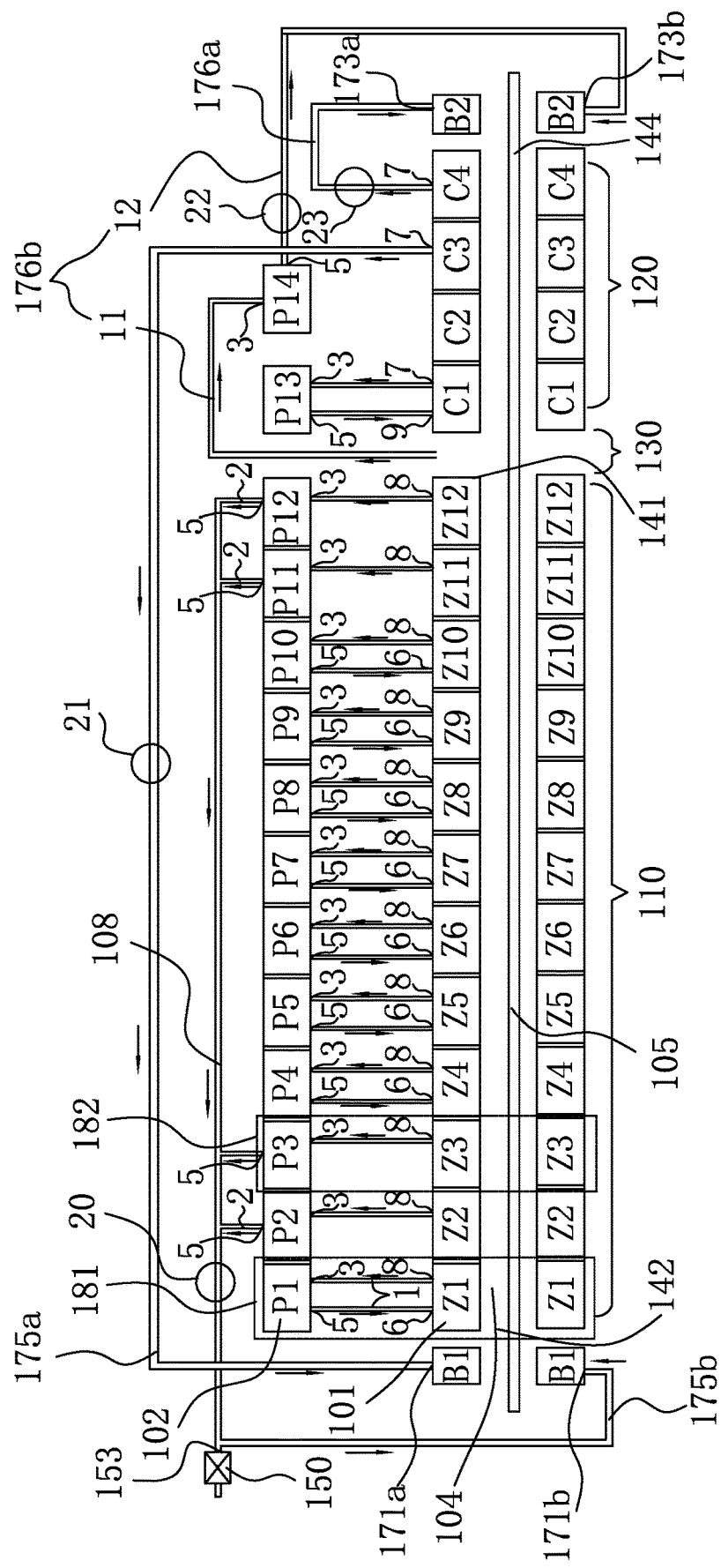
FIG. 2 shows a schematic diagram of the flow directions of intake gas and exhaust gas when the reflow oven in FIG. 1 works in an inert gas mode.
Figure 3:
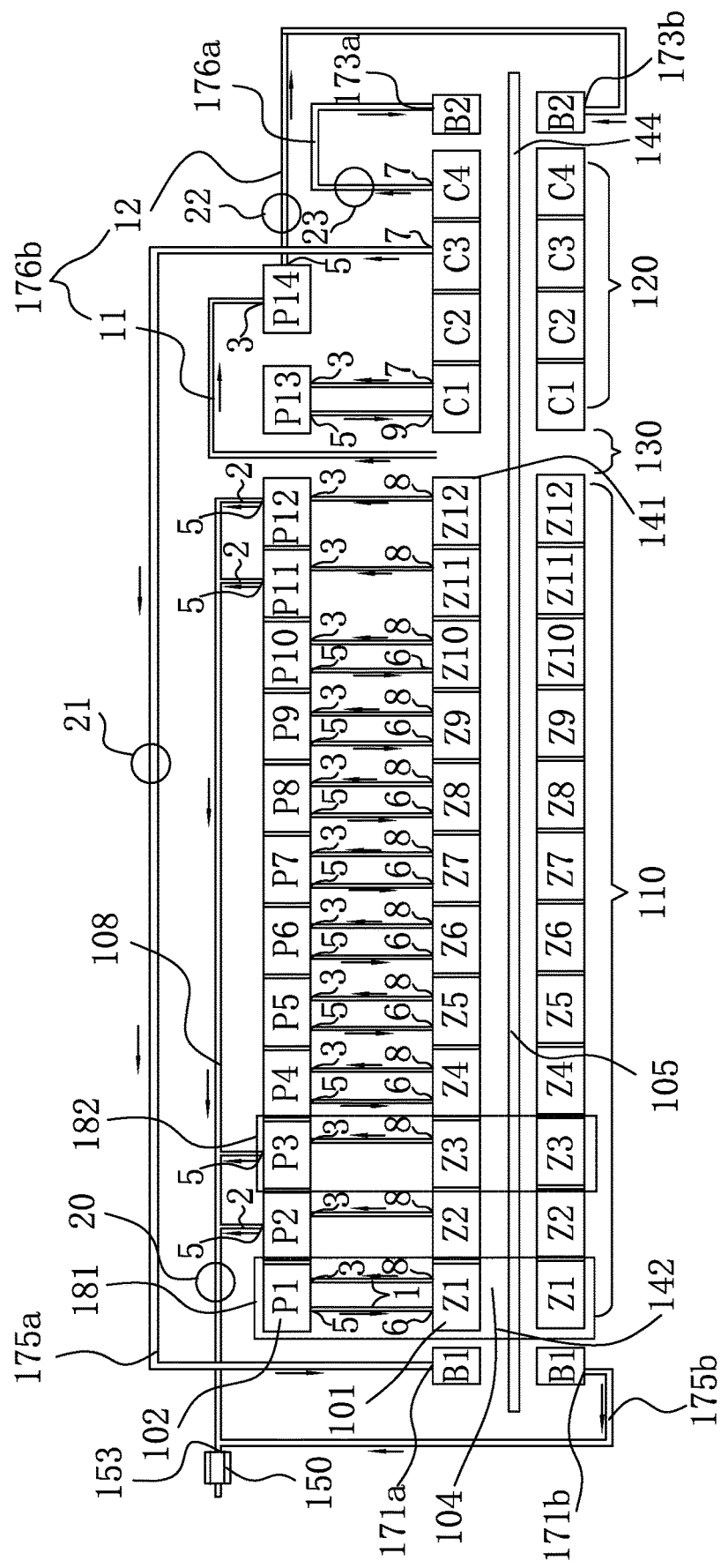
FIG. 3 shows a schematic diagram of the flow directions of the intake gas and the exhaust gas when the reflow oven in FIG. 1 works in an air mode.

FIGS. 2 and 3 show schematic diagrams of the flow directions of intake gas and exhaust gas when the reflow oven 100 in FIG. 1 works in the nitrogen mode and in the air mode respectively, wherein arrows indicate the flow directions of gas flows.

As shown in FIG. 2, the reflow oven 100 works in the nitrogen mode. In this case, the valve device 150 of the reflow oven 100 is closed. The nitrogen source (not shown in figures) is opened to supply clean nitrogen to the reflow oven 100. In the internal circulation unit 181 of the heating zone 110, a flow guide device in the soldering sub-zone causes the gas to enter the purification zone gas flow inlet 3 of the corresponding soldering sub-zone from the heating zone gas flow outlet 8 through the purification branch pipe 1. In the soldering sub-zone, the volatile pollutants in the gas are catalytically decomposed such that the gas is purified. The purified gas flows from the purification zone gas flow outlet 5 back to the soldering sub-zone again through the purification branch pipe 1 via the heating zone gas flow inlet 6. Thus, in the internal circulation unit 181, the nitrogen is recycled internally. In the external circulation unit 182 of the heating zone 110, the flow guide device in the soldering sub-zone causes the gas to enter the purification zone gas flow inlet 3 of the corresponding soldering sub-zone from the heating zone gas flow outlet 8 through the purification branch pipe 1. In the purification sub-zone, the volatile pollutants in the gas flow are catalytically decomposed such that the gas is purified. The purified gas enters the controllable discharge pipeline 108 from the purification zone gas flow outlet 5 through the discharge branch pipe 2. The gas flow in the controllable discharge pipeline 108 flows in the direction of the valve device 150, and since the valve device 150 is closed, the gas in the controllable discharge pipeline 108 enters the lower side of the inlet zone B1 via the inlet zone isolation duct 175b. In the external circulation unit 182, the soldering sub-zone continuously receives fresh nitrogen from the hearth inlet 142 and the hearth outlet 144 through the hearth 104. The external circulation units 182 are provided at front and rear ends of the heating zone 110. In an embodiment of the present disclosure, the external circulation units 182 are the heating work units in which the soldering sub-zones Z2, Z3, Z11, Z12 are located, that is, the second heating work unit, the third heating work unit, the last heating work unit, and the second-to-last heating work unit of the soldering portion 101. The gas in the internal circulation unit 181 is recycled internally, and only a small amount of new nitrogen needs to be supplemented from the external environment, or almost no new nitrogen needs to be supplemented from the external environment. The external circulation unit 182 needs to be supplemented with fresh nitrogen from the nitrogen source, and therefore, the consumption of nitrogen can be reduced by providing as few external circulation units as possible. It should be noted that the present disclosure illustrates an example, and in other embodiments, the internal circulation units and the external circulation units may be arranged depending on actual process conditions.

In the cooling zone 120, the temperatures of the soldering sub-zones C1-C4 gradually decrease, wherein the cooling work unit formed by the soldering sub-zone C1 with the higher temperature and the corresponding purification sub-zone P13 is an internal circulation unit, and the purification sub-zone P13 can purify the gas flow in the soldering sub-zone C1. The temperatures of the soldering sub-zones C2-C4 are lower, less volatile pollutants are generated, so no further communication with the purification sub-zones is needed.

The inlet zone isolation duct 175a is in communication with the cooling zone gas flow outlet 7 of the soldering sub-zone C3 so as to supply a gas flow to the upper side of the inlet zone B1 through the gas accelerating device 21. Due to the fact that the valve device 150 is closed, the gas flow in the controllable discharge pipeline 108 is supplied to the lower side of the inlet zone B1 through the inlet zone isolation duct 175b. The inlet zone B1 is configured such that the gas flow supplied from the inlet zone isolation duct 175a flows downward perpendicular to a conveying direction of the conveying device 105, and the gas flow in the inlet zone isolation duct 175b flows upward perpendicular to the conveying direction of the conveying device 105, thereby forming a gas curtain in the inlet zone B1 to prevent outside air from entering the hearth inlet 142.

One end of the outlet zone isolation duct 176a is in communication with the cooling zone gas flow outlet 7 of the soldering sub-zone C4, and the other end thereof is in communication with the upper side of the outlet zone B2, such that the outlet zone isolation duct 176a supplies a gas flow to the upper side of the outlet zone B2 with the aid of the gas accelerating device 23. One end of the outlet zone isolation duct 176b is in communication with the isolation and exhaust zone 130 through one purification sub-zone P14, and the other end thereof is in communication with the lower side of the outlet zone B2, such that the outlet zone isolation duct 176a supplies a gas flow to the lower side of the outlet zone B2 with the aid of the gas accelerating device 22. The outlet zone B2 is configured such that the gas flow supplied from the outlet zone isolation duct 176a flows downward perpendicular to the conveying direction of the conveying device 105, and the gas flow in the outlet zone isolation duct 176b flows upward perpendicular to the conveying direction of the conveying device 105, thereby forming a gas curtain in the outlet zone B2 to prevent outside air from entering the hearth outlet 144. The purification sub-zone P14 can purify the gas from the isolation and exhaust zone 130, so that the content of volatile pollutants liable to condensation in the gas flow entering the lower side of the outlet zone B1 is lower.

In the nitrogen work mode, the catalyst in the purification sub-zones P1-P14 can maintain good activity, the maintenance interval is longer, and the gas curtains of the inlet zone B1 and the outlet zone B2 can block the outside air from entering the hearth 104 to ensure the working atmosphere inside the reflow oven 100.

As shown in FIG. 3, the reflow oven 100 works in the air mode. In this case, the valve device 150 of the reflow oven 100 is opened. The reflow oven 100 working in the air mode works as in the nitrogen mode shown in FIG. 2 with the difference that the valve device 150 is opened and the gas flows in the controllable discharge pipeline 108 and the inlet zone isolation duct 175b are discharged to the outside of the reflow oven 100 by the valve device 150. The hearth inlet 142 and the hearth outlet 144 are in communication with an air source to continuously supply clean air to the reflow oven 100. In the air mode, the purification sub-zones P1-P14 can also have purification function to some extent, but compared with the nitrogen mode, the catalyst in the purification sub-zones P1-P14 is relatively liable to deactivation and the catalytic efficiency is relatively low in the air mode. Therefore, part of the gas flow containing more volatile pollutants less liable to condensation needs to be discharged to the outside of the reflow oven in due course in order to extend maintenance and cleaning intervals.

In the present disclosure, the heating work units in which the soldering sub-zones Z2, Z3, Z11, Z12 are located, that is, the second heating work unit, the third heating work unit, the last heating work unit and the second-to-last heating work unit of the soldering portion 101, are provided as external circulation units 182 in order to ensure that the reflow oven 100 can normally work in the air mode.

After many observations and experiments, the inventor has found that the soldering sub-zones Z2, Z3, Z11, Z12 are zones where the soldering flux generates more volatile pollutants. this is due to the following fact: the volatile pollutants come from the soldering flux on the circuit board, the temperature of the soldering sub-zone Z1 close to the hearth inlet 142 is relative low, and the soldering flux has not yet reached a temperature where a large amount of volatile pollutants are generated, in contrast, Z2 and Z3 are the heating work units where the circuit board has just entered the soldering portion 101, and the circuit board has reached a certain increased temperature after being heated by the soldering sub-zone Z1, at this time, the soldering flux on the circuit board is just heated to a temperature at which volatile pollutants are likely to be generated, thereby generating more volatile pollutants. Therefore, the heating work unit where the soldering sub-zone Z1 is located is provided as an internal circulation unit, and the heating work units where the soldering sub-zones Z2, Z3 are located are provided as external circulation units. The soldering sub-zones Z11, Z12 are relatively high-temperature portions of the heating zone 110, the soldering flux is prone to generate more volatile pollutants at high temperatures, and the heating work units where the Z11, Z12 are located are also provided as external circulation units. Therefore, in the air mode, the gas in the soldering sub-zones Z2, Z3, Z11, Z12 are discharged in due course, so that the gas in the hearth 104 can be kept clean for a long time, and the maintenance burden can be reduced.

The reflow oven of the present disclosure needs regular service and cleaning. In the regular service operation, the heating device in the purification sub-zone needs to be adjusted to a service work mode so as to activate the catalyst on the catalytic device. In the nitrogen work mode, the catalyst can maintain good activity for a longer time, and the maintenance period is relatively long. In the air work mode, the catalyst is susceptible to oxygen in the air to reduce activity, and the maintenance interval is relatively short. The maintenance operation is generally performed before the air work mode is switched to the nitrogen work mode, in order to ensure a good activity of the catalyst in the nitrogen work mode.

After observation, analysis and research, the applicant has found that in the reflow oven with nitrogen as the working atmosphere, the gas inside the reflow oven is separated from the external environment, and the reflow oven is sealed by the gas curtains formed at the inlet zone and the outlet zone. For each internal circulation unit of the heating zone, the gas is circulated inside the internal circulation unit, and the gas flow inside the internal circulation unit is purified by virtue of the purification function of the purification section, such that the consumption of nitrogen is reduced. However, such a reflow oven using nitrogen as the working atmosphere is not suitable for using air as the working atmosphere. If the existing nitrogen reflow oven is not modified, only by communicating the two ends of the hearth of the existing nitrogen reflow oven with the atmosphere, the existing nitrogen reflow oven does not meet the soldering process of the air reflow oven.

If the existing nitrogen reflow oven is additionally provided with a set of air circulation pipelines and a control device according to the existing air reflow oven, a valve and a pipeline for discharging air need to be added in each soldering sub-zone such that the gas in each soldering sub-zone is gathered together and then discharged to a preset zone, and in order not to influence the existing nitrogen reflow soldering performance after modification, more pipelines and valves need to be added, the pipelines become complicated, and structure of the existing nitrogen reflow oven is greatly modified, resulting in high costs.

In the present invention, most of the soldering sub-zones of the heating zone are still provided as the internal circulation units in the existing nitrogen reflow oven, and the soldering sub-zones with more volatile pollutants are selectively provided as the external circulation units, such that the volatile pollutants can be discharged in due course in the air mode, thereby meeting the process requirements in the air mode. In addition, the reflow oven in the present disclosure can also utilize the purification section of the reflow oven to purify the air in the air mode, so that less volatile pollutants are discharged from the reflow oven. The reflow oven with the purification section in the present disclosure can meet the process requirements both in the nitrogen mode and in the air mode.

In the reflow oven of the present disclosure, by modifying the discharge pipeline and the valve device as mentioned above, the soldering work can be effectively carried out in the two work modes, namely the air and nitrogen modes, by using a set of equipment. In the nitrogen work mode, the yield of the processed circuit board can meet the requirements. With the provision of the purification section, the nitrogen inside the reflow oven can be recycled, only a small amount of nitrogen needs to be supplemented from the nitrogen source, and the use of nitrogen can be saved. In the air work mode, the gas containing more volatile pollutants is discharged to the outside of the reflow oven and would not be accumulated in the reflow oven, and the yield of the processed circuit board can still meet the requirements. When the work mode needs to be switched, only the valve device needs to be opened or closed, so that the switching between the two work modes is simple and easy to operate.

This description uses examples to disclose the present disclosure, in which one or more examples are illustrated in the drawings. Each example is provided to explain the present disclosure but is not intended to limit the present disclosure. In fact, it would have been obvious to those skilled in the art that various modifications and variations can be made to the present disclosure without departing from the scope or spirit of the present disclosure. For example, the illustrated or described features as part of one embodiment can be used with another embodiment to provide a further embodiment. Thus, it is intended that the present disclosure cover the modifications and variations made within the scope of the appended claims and their equivalents.

The invention claimed is:

1. A reflow oven capable of working in an inert gas mode and in an air mode, comprising:
   a soldering section, the soldering section being configured to treat a circuit board to be soldered, the soldering section being provided with N soldering sub-zones, the soldering section comprising a heating zone and a cooling zone, and each soldering sub-zone in the heating zone is in communication with a corresponding one of the purification sub-zones;
   a purification section, the purification section comprising M purification sub-zones, wherein each of the M purification sub-zones is in communication with a corresponding one of the N soldering sub-zones, and M is less than or equal to N;
   a controllable discharge pipeline and K discharge branch pipes, each of the K discharge branch pipes communicating one of the M purification sub-zones with the controllable discharge pipeline, wherein K is less than or equal to M; and
   a valve device configured to, at the inlet thereof, connect with the outlet of the controllable discharge pipeline to control open/close of the communication between the controllable discharge pipeline and the external environment, wherein
   each soldering sub-zone in the heating zone and the purification sub-zone in communication with the soldering sub-zone form a heating work unit including an internal circulation unit or an external circulation unit, wherein at least one heating work unit includes an external circulation unit; and
   each of the purification sub-zones is provided with a purification zone gas flow inlet and a purification zone gas flow outlet, the purification zone gas flow inlet and the purification zone gas flow outlet of the purification sub-zone of the internal circulation unit are both in communication with a corresponding soldering sub-zone, the purification zone gas flow inlet of the purification sub-zone of the external circulation unit is in communication with a corresponding soldering sub-zone, and the purification zone gas flow outlet of the purification sub-zone of the external circulation unit is in communication with the controllable discharge pipeline through a corresponding discharge branch pipe of the K discharge branch pipes.

2. The reflow oven of claim 1, wherein
the external circulation units are provided at or close to front and rear ends of the heating zone.

* * * * *